(12) United States Patent
Drazic et al.

(10) Patent No.: US 7,192,139 B2
(45) Date of Patent: Mar. 20, 2007

(54) HIGH CONTRAST STEREOSCOPIC PROJECTION SYSTEM

(75) Inventors: Valter Drazic, Betton (FR); Estill Thone Hall, Jr., Fishers, IN (US); Eugene Murphy O'Donnell, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 104 days.

(21) Appl. No.: 10/537,084

(22) PCT Filed: Nov. 26, 2003

(86) PCT No.: PCT/US03/37977
§ 371 (c)(1),
(2), (4) Date: Jun. 1, 2005

(87) PCT Pub. No.: WO2004/051994

PCT Pub. Date: Jun. 17, 2004

(65) Prior Publication Data

US 2006/0082731 A1  Apr. 20, 2006

Related U.S. Application Data

(60) Provisional application No. 60/430,896, filed on Dec. 4, 2002.

(51) Int. Cl.
*G02B 27/22* (2006.01)

(52) U.S. Cl. .............. 353/8; 353/94; 353/20; 359/464

(58) Field of Classification Search .......... 353/7, 353/8, 10, 20, 31, 33, 34, 37, 94; 349/5, 349/7, 8, 9; 348/742, 743, 744, 758, 42, 348/51, 52; 359/462, 464, 472, 475, 478, 359/15
See application file for complete search history.

(56) References Cited

U.S. PATENT DOCUMENTS 4,364,039 A  12/1982  Penz
5,716,122 A *  2/1998  Esaki et al. ............. 353/33

(Continued)

FOREIGN PATENT DOCUMENTS

WO  WO01/69941  *  9/2001

OTHER PUBLICATIONS

Patent Abstracts of Japan. vol. 1997, No. 08, Aug. 29, 1997, & JP 9-096780 (Nippon Hoso Kyokai), Apr. 8, 1997.
Copy of Search Report Dated Apr. 5, 2004.

*Primary Examiner*—William C. Dowling
(74) *Attorney, Agent, or Firm*—Joseph J. Laks; Harvey D. Fried; Patricia Verlangieri

(57) ABSTRACT

A stereoscopic projection system is provided having two channels, each having two LCOS imagers that modulate light on a pixel-by pixel basis. A first polarizing beam splitter is configured to direct light of a first polarization onto a first channel first stage LCOS imager and direct light of a second polarization, opposite the first polarization, onto a second channel first stage LCOS imager. A relay lens system directs the output of the first stage imagers into a second polarizing beam splitter. The second polarizing beam splitter is configured to direct light of the second polarization onto the first channel second stage LCOS imager and direct light of the first polarization onto the second channel second stage LCOS imager.

12 Claims, 2 Drawing Sheets

U.S. PATENT DOCUMENTS

| | | | |
|---|---|---|---|
| 5,978,142 A * | 11/1999 | Blackham et al. | 359/618 |
| 6,304,302 B1 | 10/2001 | Huang et al. | |
| 6,547,396 B1 * | 4/2003 | Svardal et al. | 353/8 |
| 6,561,557 B2 | 5/2003 | Choi | |
| 6,561,652 B1 | 5/2003 | Kwok et al. | |
| 6,637,888 B1 | 10/2003 | Haven | |
| 2002/0159033 A1 | 10/2002 | van Gelder et al. | |
| 2003/0103171 A1 | 6/2003 | Hall, Jr. et al. | |
| 2005/0174495 A1 * | 8/2005 | Itoh et al. | 348/758 |

* cited by examiner

HIGH CONTRAST STEREOSCOPIC PROJECTION SYSTEM

CROSS-REFERENCE TO RELATED APPLICATIONS

This application claims the benefit, under 35 U.S.C. § 365 of International Application PCT/US03/37977, filed Nov. 26, 2003, which was published in accordance with PCT Article 21(2) on Jun. 17, 2004 in English and which claims the benefit of United States provisional patent application No. 60/430,896, filed Dec. 4, 2002.

FIELD OF THE INVENTION

The present invention relates generally to optical projection systems and more particularly to a high contrast stereoscopic projection system.

BACKGROUND OF THE INVENTION

Liquid crystal displays (LCDs), and particularly liquid crystal on silicon (LCOS) systems using a reflective light engine or imager, are becoming increasingly prevalent in imaging devices such as rear projection television (RPTV). In an LCOS system, projected light is polarized by a polarizing beam splitter (PBS) and directed onto a LCOS imager or light engine comprising a matrix of pixels. Throughout this specification, and consistent with the practice of the relevant art, the term pixel is used to designate a small area or dot of an image, the corresponding portion of a light transmission, and the portion of an imager producing that light transmission.

Each pixel of the imager modulates the light incident on it according to a gray-scale factor input to the imager or light engine to form a matrix of discrete modulated light signals or pixels. The matrix of modulated light signals is reflected or output from the imager and directed to a system of projection lenses which project the modulated light onto a display screen, combining the pixels of light to form a viewable image. In this system, the gray-scale variation from pixel to pixel is limited by the number of bits used to process the image signal. The contrast ratio from bright state (i.e., maximum light) to dark state (minimum light) is limited by the leakage of light in the imager.

One of the major disadvantages of existing LCOS systems is the difficulty in reducing the amount of light in the dark state, and the resulting difficulty in providing outstanding contrast ratios. This is, in part, due to the leakage of light, inherent in LCOS systems.

In addition, since the input is a fixed number of bits (e.g., 8, 10, etc.), which must describe the full scale of light, there tend to be very few bits available to describe subtle differences in darker areas of the picture. This can lead to contouring artifacts.

One approach to enhance contrast in LCOS in the dark state is to use a COLORSWITCH™ or similar device to scale the entire picture based upon the maximum value in that particular frame. This improves some pictures, but does little for pictures that contain high and low light levels. Other attempts to solve the problem have been directed to making better imagers, etc. but these are at best incremental improvements.

Stereoscopic projection systems are used, for example, in 3D theaters to create a three-dimensional image by providing different, oppositely polarized images to the eyes of a viewer. In LCOS imager systems, polarized light must be provided to the LCOS imager for modulation. The oppositely polarized light is typically not used. Instead it is directed away from the projection path.

What is needed is a stereoscopic projection system that enhances the contrast ratio for video images, particularly in the dark state, and reduces contouring artifacts.

SUMMARY OF THE INVENTION

The present invention provides a stereoscopic projection system that utilizes both of the oppositely polarized light signals, enhances the contrast ratio for video images, particularly in the dark state, and reduces contouring artifacts. The stereoscopic projection system, comprises two channels, each having two LCOS imagers that modulate light on a pixel-by pixel basis. A first polarizing beam splitter is configured to direct light of a first polarization onto the first channel first stage LCOS imager and direct light of a second polarization, opposite the first polarization, onto the second channel first stage LCOS imager. A relay lens system directs the output of the first stage imagers into a second polarizing beam splitter. The second polarizing beam splitter is configured to direct light of the second polarization onto the first channel second stage LCOS imager and direct light of the first polarization onto the second channel second stage LCOS imager. Since both polarizations of light are used throughout the stereoscopic projection system greater illumination efficiency may be achieved. Because each channel is modulated in two stages, greater contrast and addressing depth may be achieved.

BRIEF DESCRIPTION OF THE DRAWING

The invention will now be described with reference to the accompanying figures, in which.

DETAILED DESCRIPTION OF THE INVENTION

Figure 1:
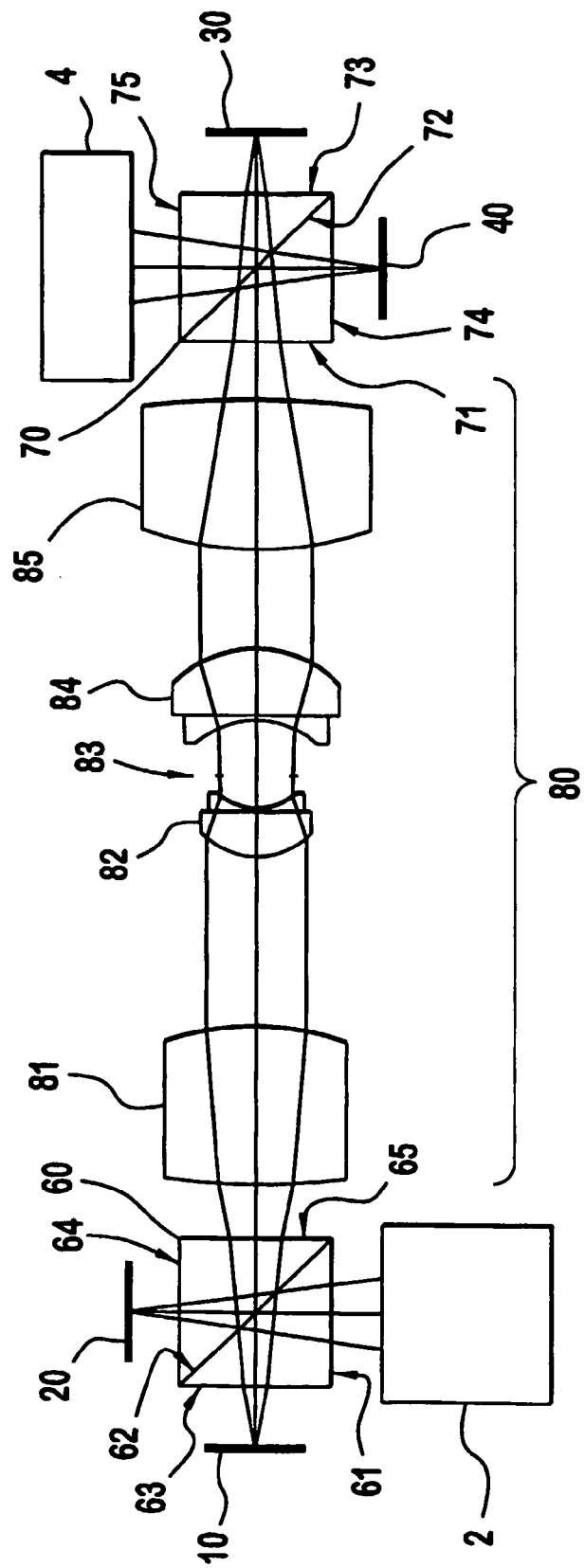
FIG. 1 shows a block diagram of a stereoscopic projection system according to an exemplary embodiment of the present invention.

The present invention provides a two stage stereoscopic projection system. In an exemplary embodiment of the present invention, illustrated in FIG. 1, a two stage stereoscopic projection system comprises two first stage imagers 10, 20 and two second stage imagers 30, 40. The first stage imagers 10, 20 comprise a first channel first stage imager 10 and a second channel first stage imager 20, which are positioned proximate a first polarizing beam splitter 60 to receive oppositely polarized light beams and configured to modulate the polarized light beams to provide matrices of polarized light pixels. The second stage imagers 30, 40 comprise a first channel second stage imager 30 and a second channel second stage imager 40 positioned proximate a second polarizing beam splitter 70, and used to boost the contrast of the matrices of polarized light pixels from the corresponding first stage imagers 10, 20 by dynamically modulating each polarization or channel a second time, thereby controlling the black state with an additional imager. Thus, the projection system illustrated in FIG. 1, simultaneously takes advantage of a high contrast, depth of addressing, polarization recovery and 3D visualization.

In the exemplary projection system illustrated in FIG. 1, an illumination system 2 provides randomly polarized light to the first polarizing beam splitter 60. The illumination system 2 comprises a lamp (not shown), which emits light, an integrator (not shown), such as a light pipe or fly eye lens, which collects the light emitted by the lamp and directs the light toward the first polarizing beam splitter 60, a system for scrolling colors or for field sequential color generation (not shown), and a relay lens (not shown)for projecting the illumination.

Figure 2:
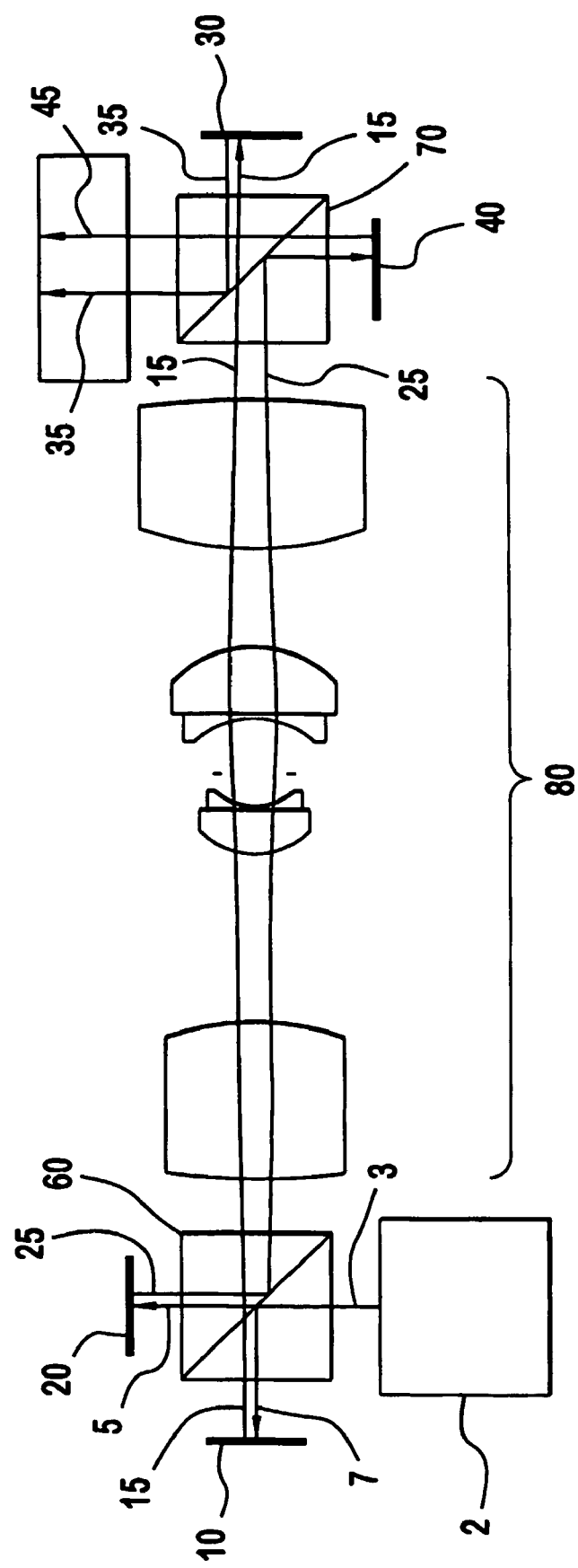
FIG. 2 shows the two-stage modulation of two oppositely polarized channels by the stereoscopic projection system of FIG. 1 according to an exemplary embodiment of the present invention.

Randomly polarized light 3 (shown in FIG. 2) from the illumination system 2, enters a first face 61 of the polarizing beam splitter 60. The randomly polarized light is polarized by a polarizing surface 62 of the first polarizing beam splitter 60 into a beam of s-polarized light 7 (shown in FIG. 2) and a beam of p-polarized light 5 (shown in FIG. 2). The beam of s-polarized light 7 is deflected through a second face 63 of the first polarizing beam splitter 60 and onto a first channel first stage LCOS imager 10. The first channel first stage LCOS imager 10 comprises a matrix of pixels that individually modulate the light incident upon them according to a gray scale value provided to the imager for that pixel. The light incident upon the imager is rotated ninety degrees and reflected by the imager. Thus, the first channel first stage LCOS imager directs a first channel matrix of modulated light pixels 15 (shown in FIG. 2), comprising p-polarized light back through the second face 63 of the first polarizing beam splitter 60. The first channel matrix of modulated pixels 15 then passes through the polarizing surface 62 and fourth face 65 of the first polarizing beam splitter 60.

The beam of p-polarized light 5 passes through the polarizing surface 62 and a third face 64, and onto a second channel first stage LCOS imager 20. The second channel first stage LCOS imager 20 also comprises a matrix of pixels that individually modulate the light incident upon them according to a gray scale value provided to the imager for that pixel. The light incident upon the imager is rotated ninety degrees and reflected by the imager. Thus, the second channel first stage LCOS imager 20 directs a second channel matrix of modulated light pixels 25 (shown in FIG. 2), comprising s-polarized light back through the third face 64 of the first polarizing beam splitter 60. The s-polarized second channel matrix of modulated light pixels 25 is then deflected by polarizing surface 62 through the fourth face 65 of the first polarizing beam splitter 60.

The first channel matrix of modulated pixels 15 and the second channel matrix of modulated light pixels 25 are simultaneously focused by a relay lens system 80 configured to focus the matrices of modulated light pixels from the first stage imagers on a pixel-by-pixel basis onto the corresponding pixels of the second stage imagers. The relay lens system provides a magnification of about −1 and a highly ensquared energy, whereby a large percentage of the light energy from a particular pixel in a first stage imager 10, 20 is ensquared within a square area of the corresponding pixel of a second stage imager. In an exemplary embodiment, this relay lens system 80 comprises a double-gauss lens set, which is preferably symmetrical, and consists of a pair of asphrical acrylic lenses 81, 85 surrounding a pair of glass acromatic lens 82, 84, with a lens stop 83 between the acromatic lenses. Suitable lens surfaces can be developed using ZEMAX™ software. An exemplary lens system is described in U.S. patent application Ser. No. 10/537,185, which is incorporated herein by reference.

The relay lens system 80 is configured to focus the matrices of modulated light pixels 15, 25 from the first stage imagers 10, 20 on a pixel-by-pixel basis onto the corresponding pixels of the second stage imagers 30, 40, through the second polarizing beam splitter 70. Lens system 80 is accordingly positioned between the first polarizing beam splitter 60 and the second polarizing beam splitter 70.

First channel modulated matrix of light pixels 15 enters second polarizing beam splitter 70, through first face 71, and because it is p-polarized light, it passes through polarizing surface 72 and second face 73 onto first channel second stage LCOS imager 30. First channel second stage LCOS imager 30 comprises a matrix of pixels that individually modulate the light incident upon them according to a gray scale value provided to the imager for that pixel. The light incident upon the imager is rotated ninety degrees and reflected by the imager. Thus, the first channel second stage LCOS imager 30 directs a first channel matrix of twice modulated light pixels 35 (shown in FIG. 2), comprising s-polarized light back through the second face 73 of second polarizing beam splitter 70. The first channel matrix of twice modulated pixels 35 is then deflected by polarizing surface 72 through fourth face 75 of the second polarizing beam splitter 70.

Because the output of each pixel of the first channel first stage LCOS imager 10 is focused onto a corresponding pixel of the first channel second stage imager 30, the output of each pixel of the first channel second stage imager 30 is twice modulated, once by the first channel first stage LCOS imager 10 and again by the first channel second stage imager 30. The advantage of the combination of a first stage imager and a second stage imager is that it boosts the contrast of the channel. If the contrast using one imager and the optical system used around the imager was c, than using a two stage system results in a contrast of $c^2$. Another advantage is that if the depth of addressing for one imager is 8 bits, using two imagers results in the advantage of getting 16 bit levels for addressing, hence improving the contouring and further image processing.

Second channel modulated matrix of light pixels 25 enters the second polarizing beam splitter 70, through first face 71, and because it is s-polarized light, it is deflected by polarizing surface 72 through third face 74 onto second channel second stage LCOS imager 40. Second channel second stage LCOS imager 30 comprises a matrix of pixels that individually modulate the light incident upon them according to a gray scale value provided to the imager for that pixel. The light incident upon the imager is rotated ninety degrees and reflected by the imager. Thus, the second channel second stage LCOS imager 40 directs a second channel matrix of twice modulated light pixels 45 (shown in FIG. 2), comprising p-polarized light back through the third face 74 of second polarizing beam splitter 70. The second channel matrix of twice modulated pixels 45 then passes through the polarizing surface 72 and fourth face 75 of the second polarizing beam splitter 70.

As with the first channel, the output of each pixel of the second channel first stage LCOS imager 20 is focused onto a corresponding pixel of the second channel second stage imager 40. Thus, the output of each pixel of the second channel second stage imager 40 is twice modulated, once by the second channel first stage LCOS imager 20 and again by the second channel second stage imager 40.

In one exemplary embodiment of the invention, first channel imagers 10, 30 are addressed with the same video signals as second channel imagers 20, 40. Thus, the second polarity light beam from the first polarizing beam splitter 60 is recycled by the second channel, and the intensity or brightness of the viewable image is about twice the level of a viewable image of a single channel two-stage projection system, in which one polarization of light is not used. In this embodiment, the life of the lamp can be increased, because less light is required from the lamp in order to achieve the same level of light in the viewable image due to the recycling of the second channel or polarity of light.

In an alternate embodiment of the invention, the first channel imagers 10, 30 are addressed with a first video signal intended for a first eye of a viewer, and the second channel imagers 20, 40 are addressed with a second video signal intended for a second eye of the viewer. The matrix of twice modulated first channel pixels of light 35 and the matrix of twice modulated second channel pixels of light 45 are projected on a screen (not shown) by projection lens system 4 with orthogonal polarizations. A three dimensional (3D) viewing system is provided where one channel is addressed with the video signal intended for one eye, while the other channel is addressed with the video signal intended for the second eye. Polarization goggles worn by the viewer select the right image for each eye resulting in stereoscopic viewing.

The present invention provides several advantages. Very high contrast and addressing depth are provided by the two stages of imagers for each channel. Light efficiency may be provided through polarization recycling by the additional channel. 3D capability can be provided by addressing the first channel imagers and the second channel imagers with different video signals intended for the different eyes of a viewer. Also, other than the imagers, the first channel and the second channel can utilize the same components (i.e., illumination system, polarizing beam splitters, relay lens system, and projection lens system) providing stereoscopic projection with minimal parts.

The foregoing illustrates some of the possibilities for practicing the invention. Many other embodiments are possible within the scope and spirit of the invention. For example, first channel imagers 10, 30 of the exemplary embodiment illustrated in FIGS. 1 and 2 and described above receive p-polarized light and s-polarized light respectively and the second channel imagers 20,40 receive s-polarized light and p-polarized light respectively. However, the polarizations may be reversed within the scope of the present invention by exchanging the positions of the imagers. It is, therefore, intended that the foregoing description be regarded as illustrative rather than limiting, and that the scope of the invention is given by the appended claims together with their full range of equivalents.

What is claimed is:

1. A stereoscopic projection system, comprising:
   a first channel first stage imager and a second channel first stage imager, each configured to modulate polarized light input on a pixel-by-pixel basis proportional to gray scale values provided to each pixel of the imager, rotate the polarization of the light and reflect a matrix of modulated light pixels;
   a first channel second stage imager and a second channel second stage imager, each configured to modulate a matrix of modulated pixels of light on a pixel-by-pixel basis proportional to gray scale values provided to each pixel of the imager, rotate the polarization of the light and reflect a matrix of twice modulated light pixels;
   a relay lens system configured to focus the matrices of modulated light pixels from the first stage imagers on a pixel-by-pixel basis onto the corresponding pixels of the second stage imagers;
   a first polarizing beam splitter configured to polarize light input into oppositely polarized light inputs, direct the oppositely polarized light inputs onto the first channel first stage imager and the second channel first stage imager respectively, and direct the matrices of modulated light pixels from the a first channel first stage imager and a second channel first stage imager into the relay lens system; and
   a second polarizing beam splitter configured to direct the oppositely polarized matrices of modulated light pixels from the first channel first stage imager and second channel first stage imager onto the first channel second stage imager and the second channel second stage imager respectively, and direct the matrices of twice modulated light pixels from the second stage imagers into a projection lens system.

2. The stereoscopic projection system of claim 1 wherein the first channel imagers and the second channel imagers are addressed with the same signal to enhance the brightness and contrast of the stereoscopic projection system.

3. The stereoscopic projection system of claim 1 wherein the first channel imagers are addressed with the video signal intended for a first eye of a viewer and the second channel imagers are addressed with the video signal intended for a second eye of the viewer to provide a three dimensional image.

4. The stereoscopic projection system of claim 3 further comprising oppositely polarizing lenses configured for viewing the images from the first channel and the second channel.

5. The stereoscopic projection system of claim 1 wherein the relay lens system comprises a double-gauss relay lens set.

6. A stereoscopic projection system, comprising:
   a first channel, having a first stage LCOS imager and a second stage LCOS imager;
   second channel having a first stage LCOS imager and a second stage LCOS imager;
   a first polarizing beam splitter configured to direct light of a first polarization onto the first channel first stage LCOS imager and direct light of a second polarization, opposite the first polarization, onto the second channel first stage LCOS imager; and
   a second polarizing beam splitter configured to direct light of the second polarization onto the first channel second stage LCOS imager and direct light of the first polarization onto the second channel second stage LCOS imager.

7. The stereoscopic projection system of claim 6 wherein the first channel LCOS imagers and the second channel LCOS imagers are addressed with the same video signals to project a common image with enhanced light intensity.

8. The stereoscopic projection system of claim 6 wherein the first channel LCOS imagers and the second channel LCOS imagers are addressed with different video signals to provide stereoscopic viewing.

9. The stereoscopic projection system of claim 6 further comprising a relay lens system that directs the output of both the first stage LCOS imagers onto the second stage LCOS imagers on a pixel-by-pixel basis.

10. The stereoscopic projection system of claim 9 wherein the relay lens system comprises a double-gauss relay lens set.

11. The stereoscopic projection system of claim 9 further comprising a projection lens for projecting both the first channel image and the second channel image onto a viewing screen.

12. The stereoscopic projection system of claim 11 further comprising an illumination system providing random polarity light to the first polarizing beam splitter.

* * * * *